United States Patent Office 3,544,460
Patented Dec. 1, 1970

3,544,460
DRILLING FLUID COMPOSITION
Aaron E. Markham and Kenneth A. E. Blackmore, Bellingham, Wash., assignors to Georgia-Pacific Corporation, Portland, Oreg., a corporation of Georgia
No Drawing. Continuation-in-part of application Ser. No. 313,767, Oct. 4, 1963. This application Sept. 15, 1966, Ser. No. 579,513
Int. Cl. C10m 3/34, 3/48
U.S. Cl. 252—8.5     28 Claims

ABSTRACT OF THE DISCLOSURE

A water-base drilling fluid composition comprising, as an additive, a sulfonated lignin-containing material which has been heated in a dry form at a temperature of at least 200 C.

---

This application is a continuation-in-part of application Ser. No. 313,767, filed Oct. 4, 1963, now abandoned.

This invention relates to a drilling fluid composition and a process for its use. More particularly, it relates to a composition and process of using an improved sulfonated lignin-containing material as an additive in drilling muds.

In drilling of subterranean wells such as oil, gas wells, and others, a drilling fluid or mud is used. The drilling fluid supplies lubrication, carries the cuttings to the surface of the well and also forms a filter cake on the walls of the well to decrease the loss of drilling fluid to the natural formation. The drilling fluid must be sufficiently viscous to carry the drillings suspended in the moving fluid and still be easily pumped. In the event that drilling must be stopped, it is desirable to have the drilling fluid gel so that the cuttings remain suspended in the fluid and not settle to the bottom. Some of the desired properties are imparted to the drilling fluid by the addition of a clay such as a bentonite or other known clays and other additives. To improve the thixotropic and other properties of the drilling fluid various additives are used.

Sulfonated lignin-containing materials and salts thereof have been commonly used as additives for drilling muds. These materials, comprising mainly sulfonated products of lignin or lignosulfonates, are essentially the sulfonated non-cellulosic portion of a lignocellulosic material. Lignin is a polymeric substance of substituted aromatics found in plant and vegetable tissue associated with cellulose and other plant constituents. While there is some variation in the chemical structure of the lignin and of other constituents found in the plant, depending upon the type of the plant, place where the plant is grown, and also upon the method used in recovery or isolation of the particular constituents from the plant tissue, the basic structure and properties of these materials upon sulfonation are similar and form the well known group of materials referred to herein at times as "lignosulfonate product."

One of the main sources of the lignosulfonate product or sulfonated lignin-containing material is the residual pulping liquors obtained in the pulp and paper industry industry where lignocellulosic materials such as wood, straw, corn stalks, bagasse and the like are processed to recover the cellulose or pulp. In the sulfite pulping process, the lignocellulosic material is digested with a bisulfite or sulfite to obtain a sulfonated residual pulping liquor commonly referred to as "spent sulfite liquor" containing the sulfonated lignin products. In other pulping processes, the residual pulping liquor as obtained from the process may not be a sulfonated product. However, the residual liquor or products containing the lignin portion of the lignocellulosic materials from the sulfite or other processes may be treated by various known methods to sulfonate the products to the degree desired.

While sulfonated lignin products have been used for thinning and water loss agents and emulsifiers in drilling muds, it is an object of this invention to provide a drilling composition which has enhanced properties. A further object is to provide a process of using the improved drilling mud.

The above and other objects are attained by a drilling mud composition which comprises a clayey material and an effective dispersing amount of a sulfonated lignin-containing material which has been heated at a temperature above 200° C. in a dry form without being charred or decomposed to the extent that it is insoluble in an aqueous medium. By employing a sulfonated lignin-containing material which has been heated in a dry state to a high temperature without sufficient decomposition or degradation to insolubilize the product, an improved drilling mud is obtained.

Heat treating the sulfonated lignin-containing material in solid form, at temperatures of 200° C. and above may require a pretreatment prior to heating. Without the pretreatment, often the solids, when heated to a temperature above 200 C. in a dry form, may ignite or undergo a spontaneous degradation reaction. The particular temperature at which the ignition or spontaneous reaction takes place varies somewhat with the sulfonated product, rate of heating, and the time the product is at this temperature. For example, a lignosulfonate product such as spent sulfite liquor solids may immediately ignite upon heating rapidly in the presence of air to a temperature of around 220° C. to 230° C. However, heating the spent sulfite liquor solids slowly from a temperature of 170° C. to 200° C. or maintaining the product at a lower temperature, for example, 110° C. until no further decrease in weight is obtained may prevent the spontaneous reaction. These materials generally contain in addition to sulfonated lignins other constituents such as sugars and other materials extracted from the lignocellulosic material which, when heated under non-aqueous conditions, may contribute to the ignition of the product. Generally, at temperatures of about 180° C., an evolution of vapor from the product has been noted. Thus, the ignition or the spontaneous reaction may be initiated at the higher temperatures by the reaction resulting in the evolution of the gas if the reaction is not substantially completed at the lower temperatures, or by the reaction of the products of this reaction with the sulfonated lignins or other constituents present in the product. The self-ignition or decomposition reaction is not dependent upon the presence or absence of any particular atmosphere.

One of the convenient pretreatment steps to which the sulfonated lignin-containing material may be subjected as an alternative to the preheating at an intermediate temperature is oxidation of the product prior to heating. Oxidation agents having an oxidation potential in the range of 0.8 to about 1.5 in an acid medium, such as, for example, chlorine, bromine, hydrogen peroxide, nitric acid, an alkali metal persulfate, chromates and the like may be used. The reaction of the sulfonated lignin-containing material with most of the oxidizing agents is rapid and the oxidation may be effected in a matter of a few minutes. Generally, it is most convenient to obtain the sulfonated lignin-containing material as a spray dried product and subject the product to oxidation in fluidized form with gaseous oxidizing agents. It is preferred to use a gaseous oxidizing agent such as chlorine or bromine which may be diluted with a carrier gas such as air, nitrogen, argon and the like. The carrier gas serves as a fluidizing gas and may also be used to dilute the oxidizing agent to reduce the rate of reaction in the event that the reaction is too vigorous. The oxidation with a gaseous oxidizing agent may also be carried out with the lignosulfonate product being dispersed in a non-aqueous medium as well as in a fluidized bed.

The sulfonated lignin-containing material is a hygroscopic material so that upon drying and being exposed to the atmosphere it will contain a small amount of moisture which is usually in the range of about one to four weight percent but may be as high as about eight percent and still be a dry, free flowing powder. Thus, the term "dry form" as used herein with respect to the lignosulfonate product or sulfonated lignin-containing material does not mean an anhydrous product but a product in solid form which may contain a small amount of moisture. The presence of this moisture, especially for halogenation, is desirable. A product which has been spray dried generally contains an amount of moisture which is ideal for halogenation. The lignosulfonate product in a pulverulent state may be tumbled in the drum in the process of halogenation. However, it is generally more convenient to use a powdered lignosulfonate product and to blow the halogenating agent or the gaseous oxidizing agent through a fluid bed of the powder. Ordinarily, a halogen gas is used which is preferably intermixed with a carrier of air which may be recirculated through the fluidized bed. Chlorine is the preferred halogenating agent.

The reaction of chlorine with the dry lignosulfonate product is a very rapid, exothermic reaction and may be effected in a matter of a few minutes. The time required just to pass the chlorine gas through the bed and then flush it with air to remove the excess chlorine may be sufficient. However, generally an excess of chlorine is used and made available. The total amount of chlorine taken up, reacted and adsorbed by the lignosulfonate product may be from about 0.2 to about 5 weight percent when the halogenation is carried out with a dry powder. The halogenation carried out without external heating may be sufficiently complete in a very short time such as about one minute but generally a contact time of about 10 minutes to one hour is utilized. Further contact of the lignosulfonate product with the gas for a longer period of time, for example, for two hours, apparently has no adverse effect. Very little additional halogen is taken up by the lignosulfonate product after the initial contact with the required amount of halogen. Since the reaction is exothermic, a substantial rise in temperature may be obtained upon the addition of the halogen at the beginning of the reaction. The change in temperature obtained during halogenation may thus be used as a means of determining when the halogenation reaction is substantially complete.

In the heat treatment of the lignosulfonate product in preparing the additive, no particular method of heat treatment is necessary other than heating the product in a dry state to a temperature of at least 200° C., preferably in the range of 230° C. to 270° C. The time required to maintain the material at the temperature to obtain the enhanced properties varies in a general fashion inversely with the temperature chosen. At the lower temperature, a longer time is necessary, whereas at the higher temperatures the time required just to heat the product to that temperature may be sufficient. The effectiveness of the additive appears to increase with an increase in temperature to about 270° C. as long as the material remains water-soluble. Thus, while temperatures up to about 330° C. or so may be used, the product is seldom heated above 270° C. Likewise, in the lower end, while a product obtained by heating at 200° C. is improved markedly over a non-treated product, a much greater improvement is obtained when a temperature of 230° C. and above is used. To obtain an improved product at 200° C., a heating time of from 4 to 24 hours or longer may be required, while at a temperature of 230° C. a time of one to three hours may be employed and for temperatures from around 250° C. to 270° C., a time of a minute or two or just heating the material to that temperature may be sufficient. Normally, a heating time of ¼ to one hour is used.

The heating step may be carried out using an inert atmosphere or an atmosphere of air. A somewhat improved product is obtained when air is used instead of an inert gas such as argon or nitrogen, especially with the halogenated products. The heat treatment step may be carried out using any of the methods ordinarily available in the chemical engineering art, such as carrying in a thin layer through a heated atmosphere on a conveyor belt, doing the same by means of a trough and screw conveyor, tumbling in a rotary kiln, heating in a tray dryer type apparatus maintained at elevated temperature and the like. It is most convenient, however, to effect the heating of the lignosulfonate product in a fluidized bed employing heated air as a means of supplying the heat. The air may be preheated and thus used as a fluidizing medium as well as a means of supplying the heat. If desirable, the fluid bed may also have heating elements in the bed to supply the necessary heat.

Upon heating the pretreated product, generally the pH of the product, as measured as the pH of a one percent by weight aqueous solution, changes. For most of the products, the pH will increase upon heating, while for others, such as an ammonium base lignosulfonate product, the pH may decrease possibly due to the loss of the base. To obtain an appreciably improved drilling mud additive, it is generally desirable to heat the product at the high temperature for sufficient time to obtain a significant change in the pH, i.e. at least 0.2 or 0.3 pH unit. As the product is heated beyond a certain point, it generally becomes insoluble in water. The optimum product is generally obtained when the heating is carried out to a point such that a small portion, for example, 5 to 10 percent, is insoluble, although at times it may be desirable to have a product which is substantially all soluble or the amount of insolubles is considerably larger, for example, extending to about 50% of the material. Excessive heating will result in charring of the product which destroys its effectiveness. When a product containing an appreciable amount of insolubles is desirable, generally the soluble portion is the product which is effective as a drilling mud additive so that more of the additive may be added than a product which is substantially all soluble.

Neither the degree of purity of the sulfonated lignin-containing material nor its source are critical. The products which are obtained from delignification of lignin-cellulosic materials by the sulfite or bisulfite process where the lignin is sulfonated may be used as obtained. Also, products obtained from other processes such as the alkaline pulping processes in which the lignin is not sulfonated may also be used after sulfonation by the various known processes. Likewise, hydrolysis lignin obtained by hydrolysis of lignocellulosic materials in preparation of wood sugars and "hydrotropic lignin" derived from the hydrotropic pulping process may also be sulfonated and used. The lignosulfonate products obtained may be processed prior to the heat treatment, such as by removing the sulfur dioxide and other hydrolyzable products by stripping and such. Also, the product may be further sulfonated, given a mild alkaline or acid treatment as well as subjected to a process such as fermentation, dialysis of fractionation to separate and remove certain non-ligneous constituents from the lignosulfonates or sulfonated lignin products. Also, the material may be fractionated to obtain a particular fraction of sulfonated lignins having a given molecular weight range. Most of the processing and recovery may be carried out prior to or after the heat treatment in a dry state. Generally, it is preferred to effect the separation prior to the heating, since the product obtained from the delignification process is in solution and the separations may be thus more easily effected from this solution. Also, the lignosulfonate product is usually pretreated and heat treated at the high temperatures in a dry form as a salt of calcium, sodium magnesium, ammonium, or in the salt form which is obtained from the delignification process. Salts of other metals such as chromium, iron, copper, aluminum, and mixtures thereof may also be used, if desired. In the formation of the particular metal salts, the known processes of reacting a compound of the metals with lignosulfonate may be used. Water-soluble metal salts and compounds, such as the sulfates, nitrates, and chlorides and other soluble salts as well as organic salts such as acetates may be used. The sulfate salts are preferred if a calcium base sulfite liquor is employed. Upon intermixing the heat treated material with an aqueous solution of a particular metal sulfate, the calcium precipitates as calcium sulfate, being displaced by the metal which reacts with the sulfonated lignins to form a simple salt or a complex. In effecting the reaction with a particular metal salt, the lignosulfonate product may be simply intermixed in solution with a water-soluble metal compound. The reaction may be carried out at room temperature or at an elevated temperature for a short period of time of from about 5 to 10 minutes or as long as 24 hours or longer. Usually the mixture is heated in the range of 70° C. to 100° C. for from about ½ to two hours. The interaction is generally effected at a pH below 6, preferably in the range of 2 to 4, although a pH of about 1 may also be employed.

When the water-soluble compounds of metals such as iron, chromium, aluminum and copper are intermixed with the lignosulfonate product, the actual mechanism of the interaction between the metal and the lignosulfonate obtained is not definitely known. There are indications that some type of a complex salt may be formed differing somewhat from a simple salt. Thus, the term "lignosulfonate salt" as used herein means the metal lignosulfonate reaction product regardless of the method of interaction of the metal with the sulfonated lignin.

In fresh water or gyp muds, salts of metals such as iron, aluminum, chromium or copper may be employed to advantage. In lime base muds, sodium or calcium salts are satisfactory, although if desired salts of the other metals may be used.

The drilling fluid composition having the enhanced properties may contain about the same amount of the dry heated lignosulfonate additive as normally used for the untreated products to effectively disperse the clay and the other drilling fluid constituents. Usually an amount in the range of one to ten pounds per barrel of drilling mud is used, although as little as 0.1 pound to as high as 30 pounds per barrel or higher may be employed under certain conditions. About two to six pounds per barrel usually gives the optimum effect. However, as apparent to those skilled in the drilling mud art, the particular amount used will vary somewhat with the fluid employed.

The examples below further illustrates the invention. The tests and evaluations of the drilling fluids were made in accordance with Procedure A, IV, set out in API, RP–39, 4th ed. (May 1957). In the tables, the yields and gels are expressed as pounds per square foot and the water loss as milliliters of filtrate.

The drilling fluids used contained about 45.5 pounds per barrel of a mixture of clays containing six parts by weight of a commercial drilling clay having a "yield value" of 45 barrels at 15 centipoises of mud per ton of clay and one part by weight of commercial drilling clay having a yield value of 95 barrels of 15 centipoises of mud per ton of clay.

The following examples further illustrate the invention.

EXAMPLE I

About 700 grams of spray dried fermented spent stripped calcium base spent sulfite liquor (SSL) solids from pulping western hemlock and other western softwoods were chlorinated by passing a gas containing 10% chlorine and 90% air through for one hour, and subsequently heat treated by blowing hot air through the thus fluidized bed of material. Another similar sample was treated in exactly the same way, except that instead of blowing air through the fluidized bed to give good heat transfer and to mix the powder, argon was used for this purpose. The total heating time, including the time to raise the temperature from room temperature to about 232° C., was about 60 minutes in each experiment, and except for the gas used to fluidize the bed, all conditions were the same. The pH of a one percent solution of the spent sulfite liquor prior to chlorination was 4.7. After chlorination, it has decreased to below 4 and upon heating for 60 minutes, it increased to about 6.4.

The product obtained by the use of argon was substantially lighter in color than the product obtained when air was used. Both samples were tested as lime mud thinners for drilling mud of the lime mud type with the results shown in Table I.

TABLE I.—LIME MUD RESULTS

| | | | Test results on hot rolled mud | | | |
|---|---|---|---|---|---|---|
| | Fluidizing gas | Lbs./bbl. additive | Initial gel | Yield | 10 min. gel | Water loss |
| Sample No.: | | | | | | |
| 1 | Air | 4 | 1.0 | 2.0 | 3.5 | 14.8 |
| | | 6 | 1.0 | 1.0 | 1.5 | 14.4 |
| 2 | Argon | 4 | 1.0 | 5.5 | 36.0 | 12.8 |
| | | 6 | 0.5 | 1.0 | 1.5 | 14.8 |
| 3 | {None | 4 | 13.0 | 24.0 | 130.0 | 17.9 |
| | {Untreated SSL solids | 6 | 7.0 | 4.5 | 30.0 | 14.4 |

In the above table, the test method, mud and expression of results, are all as set forth in columns 26 and 27 of U.S. Pat. No. 2,935,473. Similar results may be obtained when bromine is used in place of chlorine.

EXAMPLE II

A sulfonated lignin-containing material similar to the product used in Example I was chlorinated in the manner described in Example I and then heated to a temperature of 232° C. for 40 minutes. After the heat treatment, the product was cooled and dissolved in water and reacted with iron sulfate and sodium dichromate in an amount such as to give four percent by weight of iron, based upon the solids and eight percent by weight of sodium dichromate. The product thus obtained was compared to an iron and chromium lignosulfonate salt made from a calcium base spent sulfite liquor in a like manner with the exception that the product prior to reaction with the metals had not been chlorinated nor heat treated as described above. The results obtaisned are shown in the table below.

| | Hot rolled gyp mud, 6 lbs./bbl. addition | | | | |
|---|---|---|---|---|---|
| | IG | PV | Y | 10G | W |
| Treated lignosulfonate | 1.0 | 7.0 | 2.0 | 4.0 | 10.2 |
| Non-treated lignosulfonate | 1.5 | 7.5 | 2.5 | 4.5 | 12.7 |

EXAMPLE III

An iron salt of lignosulfonate was prepared in a manner similar to that described in Example II above except that the product was not reacted with the sodium dichromate. Also, a second iron lignosulfonate salt was prepared by forming the iron salt first and then chlorinating and heat treating the iron salt. These products were used as in drilling mud additives and compared to an iron salt of lignosulfonate which had not been so treated.

In the preparation of the second iron salt, calcium base fermented lignosulfonate product was reacted with irons sulfate to obtain an iron lignosulfonate salt which contained approximately four percent iron. The reaction was carried out by adding an iron sulfate solution to a calcium base spent sulfite liquor solution at a pH of 4 and then heating the mixture for about 30 minutes at a temperature of around 90° C. After the reaction, the calcium sulfate which had precipitated was filtered out. The solution thus obtained was spray dried and then chlorinated in a fluid bed reactor by passing a mixture containing 10% chlorine and 90° air through the bed for one hour at about 25° C. The chlorinated product was then heat treated in the fluid bed at 232° C. for 40 minutes. The additives were tested in a gypsum-containing mud. The results obtained are shown in the table below.

|  | Hot rolled gyp mud, 6 lbs./bbl. addition | | | | |
|---|---|---|---|---|---|
|  | IG | PV | Y | 10G | WL |
| Iron salt of treated lignosulfonate | 6 | 3.0 | 7.5 | 12.0 | 8.6 |
| Treated iron lignosulfonate | 6 | 0.5 | 5.0 | 9.5 | 14.1 |
| Non-treated iron lignosulfonate | 6 | 8.5 | 26.5 | 25.0 | 16.0 |

EXAMPLE IV

A calcium-base spent sulfite liquor which had been fermented and the alcohol formed by the fermentation recovered was heated in an oven at 110° C. until a constant weight was obtained. The preheated material was then heated in a column with sufficient amount of air heated to 260° C. to maintain a fluidized bed. The heating time was 10 minutes at the end of which time the temperature of the product had reached a temperature of 260° C. A solution of the product so treated had a pH of 7.4 compared to a pH of 4.5 for the untreated material.

The so-heated product was evaluated as a lime mud thinner and compared to results obtained with the product which had not been dry heated to 260° C. In the evaluation the amount of the product used was equivalent to 4 pounds per barrel. The results obtained are shown in the table below.

|  | IG | PV | Y | 10G | WL |
|---|---|---|---|---|---|
| Untreated | 1.0 | 8.5 | 1.5 | 7.0 | 19.2 |
| Treated | 1.0 | 7.5 | 0.5 | 1.5 | 21.2 |

EXAMPLE V

A drilling fluid composition was prepared wherein the sulfonated lignin-containing material was oxidized in an aqueous medium with nitric acid prior to the dry heating.

A 1200 g. sample of a concentrated, steam-stripped, fermented spent liquor from the calcium bisulfite pulping of western softwoods containing 300 g. solids was used. The spent sulfite liquor was heated to 90° C. and treated with a dilute nitric acid solution containing 15 g. of HNO₃. After adding the acid, the product was heated at 90° C. for 3.5 hours after which it was boiled for 3 minutes and then adjusted to pH 4.5 by adding a lime slurry. The product was filtered and spray-dried.

Fifty grams of the spray-dried powder were distributed on enamelware trays and heated in a forced-draft oven at 235° C. for 30 minutes. Before heating, the pH of an aqueous solution of the product was 5.0. After heating, the solution of the product had a pH of 6.4.

The product was compared as an additive in a lime base drilling mud with the original spent sulfite liquor and with a nitric acid oxidized unheated spent sulfite liquor. The results are shown below.

|  | Hot rolled lime mud, 6 lbs./bbl. addition | | | |
|---|---|---|---|---|
| Spent sulfite liquor additive | IG | Y | 10G | WL |
| Untreated | 3.0 | 26.0 | 20.0 | 16.6 |
| HNO₃ treated, unheated | 1.0 | 2.0 | 5.0 | 17.1 |
| Dry heated, HNO₃, treated product | 1.5 | 3.0 | 1.0 | 16.0 |

What is claimed is:

1. A water-base drilling fluid composition comprising a suspension of a clayey material in an aqueous medium and an effective dispersing amount of a water-soluble, heat treated sulfonated lignin-containing material, said sulfonated lignin-containing material being a spent sulfite liquor heat treated in a dry form at a temperature of at least 230° C. without charring, said spent sulfite liquor having a base selected from the group consisting of sodium, calcium and magnesium.

2. A water-base drilling fluid composition comprising a suspension of a clayey material in an aqueous medium and an effective dispersing amount of a heat treated sulfonated lignin-containing material, said sulfonated lignin-containing material being a spent sulfite liquor heated in a dry form at a temperature in the range of 230° C. to 330° C. to the extent that no more than 50% of the sulfonated lignin-containing material is insolubilized, said spent sulfite liquor having a base selected from the group consisting of sodium, calcium and magnesium.

3. A composition according to claim 2 wherein the sulfonated lignin-containing material is a calcium base spent sulfite liquor.

4. A composition according to claim 3 wherein the spent sulfite liquor is heated in a dry form at a temperature in the range of 230° C. to 270° C. to the extent that not more than 10% of the spent sulfite liquor is insolubilized.

5. A water-base drilling fluid composition comprising a suspension of a clayey material in an aqueous medium and an effective dispersing amount of a water-soluble, heat treated sulfonated lignin-containing material, said sulfonated lignin-containing material being oxidized with an oxidizing agent selected from the group consisting of chlorine, bromine, hydrogen peroxide, nitric acid, chromates and alkali metal persulfates and the oxidized product heated in the dry form at a temperature of at least 200° C. without charring.

6. A composition according to claim 5 wherein the sulfonated lignin-containing material is a spent sulfite liquor.

7. A water-base drilling fluid composition comprising a clayey material dispersed in an aqueous medium and an effective dispersing amount of a water-soluble, heat treated sulfonated lignin-containing material, said sulfonated lignin-containing material being oxidized by contacting, in a dry form, with a halogenating agent selected from the group consisting of chlorine, bromine, and mixtures thereof and subsequently heated in the dry form to a temperature of at least 200° C. without charring.

8. A composition according to claim 7 wherein the sulfonated lignin-containing material is a spent sulfite liquor.

9. A composition according to claim 8 wherein the halogenated spent sulfite liquor is heated in the dry form to a temperature in the range of 230° C. to 270° C.

10. A combination according to claim 9 wherein the halogenating agent is chlorine.

11. A combination according to claim 9 wherein the halogenating agent is bromine.

12. A water-base drilling fluid composition comprising a suspension of a clayey material in an aqueous medium and an effective dispersing amount of a heat treated sulfonated lignin-containing material, said sulfonated lignin-containing material being oxidized in a dry form with from 0.2 to about 5 weight percent of chlorine, based upon the sulfonated lignin-containing material solids and thereafter heated in the dry form at a temperature in the range of 200° C. to 330° C. until less than 50% of the sulfonated lignin-containing material is insolubilized.

13. A composition according to claim 12 wherein the sulfonated lignin-containing material is a spent sulfite liquor.

14. A composition according to claim 13 wherein the spent sulfite liquor is heated at a temperature in the range of 230° C. to 270° C. until less than 10% of the spent sulfite liquor solids are insolubilized.

15. A water-base drilling fluid composition comprising a suspension of a clayey material in an aqueous medium and an effective dispersing amount of a water-soluble metal salt of a heat treated sulfonated lignin-containing material, said sulfonated lignin-containing material in a dry form being oxidized by contacting with a halogenating agent selected from the group consisting of chlorine, bromine, and mixtures thereof and subsequently heated in the dry form to a temperature in the range of 200° C. to 330° C., said metal salt being of a metal selected from the group consisting of iron, chromium, aluminum, copper and mixtures thereof.

16. A composition according to claim 15 wherein the sulfonated lignin-containing material is a spent sulfite liquor.

17. A composition according to claim 16 wherein the spent sulfite liquor is heated at a temperature in the range of 230° C. to 270° C. to the extent that not more than 10% of the spent sulfite liquor is insolubilized.

18. A composition according to claim 17 wherein the metal is iron.

19. A composition according to claim 17 wherein the metal is chromium.

20. A composition according to claim 17 wherein the metal is aluminum.

21. A composition according to claim 17 wherein the metal is copper.

22. A composition according to claim 17 wherein the metal is chromium and iron.

23. In a process of drilling a well, wherein a drilling fluid is circulated in the well, the improvement which comprises circulating in the well a drilling fluid composition of claim 1.

24. In a process of drilling a well, wherein a drilling fluid is circulated in the well, the improvement which comprises circulating in the well a drilling fluid composition of claim 6.

25. In a process of drilling a well, wherein a drilling fluid is circulated in the well, the improvement which comprises circulating in the well a drilling fluid composition of claim 14.

26. In a process of drilling a well, wherein a drilling fluid is circulated in the well, the improvement which comprises circulating in the well a drilling fluid composition of claim 15.

27. In a process of drilling a well, wherein a drilling fluid is circulated in the well, the improvement which comprises circulating in the well a drilling fluid composition of claim 17.

28. In a process of drilling a well, wherein a drilling fluid is circulated in the well, the improvement which comprises circulating in the well a drilling fluid composition of claim 18.

References Cited

UNITED STATES PATENTS

| | | | |
|---|---|---|---|
| 2,822,358 | 2/1958 | Hearon et al. | 260—124 |
| 2,935,473 | 5/1960 | King et al. | 252—8.5 |
| 3,025,235 | 3/1962 | Smith et al. | 252—8.5 |
| 3,087,923 | 4/1963 | King et al. | 260—124 |
| 3,476,740 | 11/1969 | Markham et al. | 252—8.5X |

HERBERT B. GUYNN, Primary Examiner

U.S. Cl. X.R.

260— 124